United States Patent [19]

Czarnecki et al.

[11] Patent Number: 4,763,564
[45] Date of Patent: Aug. 16, 1988

[54] MULTIPLE UNIT AUTOMOTIVE CLIMATE CONTROL SYSTEM

[75] Inventors: John A. Czarnecki, Rockwood; Darrell D. Youngquest, Livonia, both of Mich.

[73] Assignee: Ford Motor Company, Dearborn, Mich.

[21] Appl. No.: 39,419

[22] Filed: Apr. 17, 1987

[51] Int. Cl.⁴ .............................................. B60H 1/32
[52] U.S. Cl. ....................... 98/2.11; 62/244; 98/2.14
[58] Field of Search ............... 62/244; 98/2.01, 2.11, 98/2.14, 2.15

[56] References Cited

U.S. PATENT DOCUMENTS

| 1,723,782 | 8/1929 | Holden | 98/2.15 |
| 2,203,814 | 6/1940 | Clements | 98/2.11 |
| 2,398,894 | 4/1946 | Schofield | 98/2.15 |
| 4,007,875 | 2/1977 | Stolz et al. | 98/2.11 X |
| 4,189,987 | 2/1980 | Amberg et al. | 98/2.14 |
| 4,432,213 | 2/1984 | Katahira et al. | 62/244 X |
| 4,470,270 | 9/1984 | Takada et al. | 62/244 |

FOREIGN PATENT DOCUMENTS

| 2838425 | 3/1980 | Fed. Rep. of Germany | 98/2.14 |
| 119521 | 9/1980 | Japan | 98/2.11 |
| 33513 | 2/1983 | Japan | 98/2.11 |
| 133911 | 8/1983 | Japan | 98/2.11 |
| 60-56625 | 4/1985 | Japan | 98/2.14 |

Primary Examiner—Harold Joyce
Attorney, Agent, or Firm—Jerome R. Drouillard; Roger L. May

[57] ABSTRACT

A multiple unit climate control system for an automotive vehicle having a passenger compartment including, a first air conditioning unit operable in both fresh and recirculating modes. The second air conditioning unit includes means for filtering air passing through the unit. A control system incorporated into the climate control system operates with the assistance of interior and exterior air quality sensors.

14 Claims, 4 Drawing Sheets

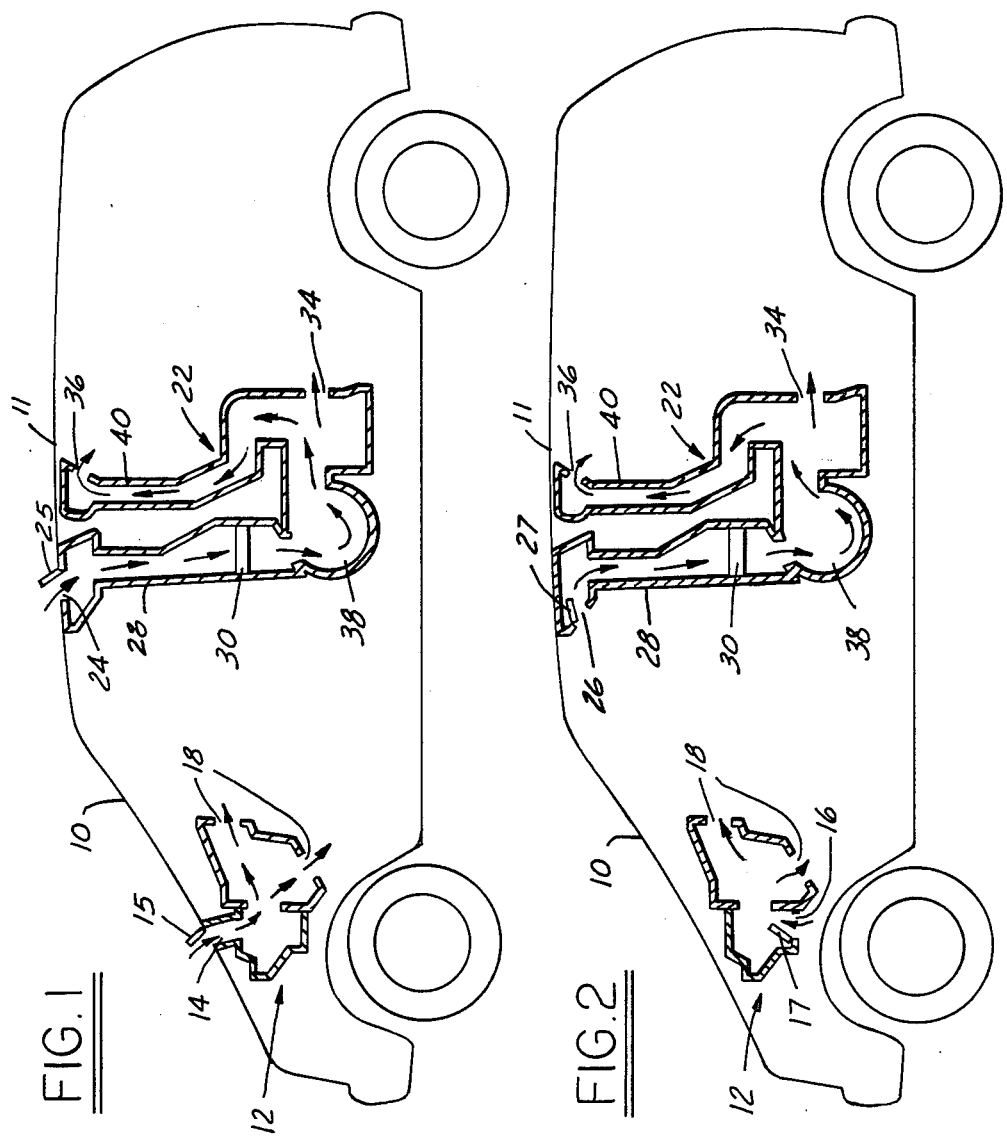

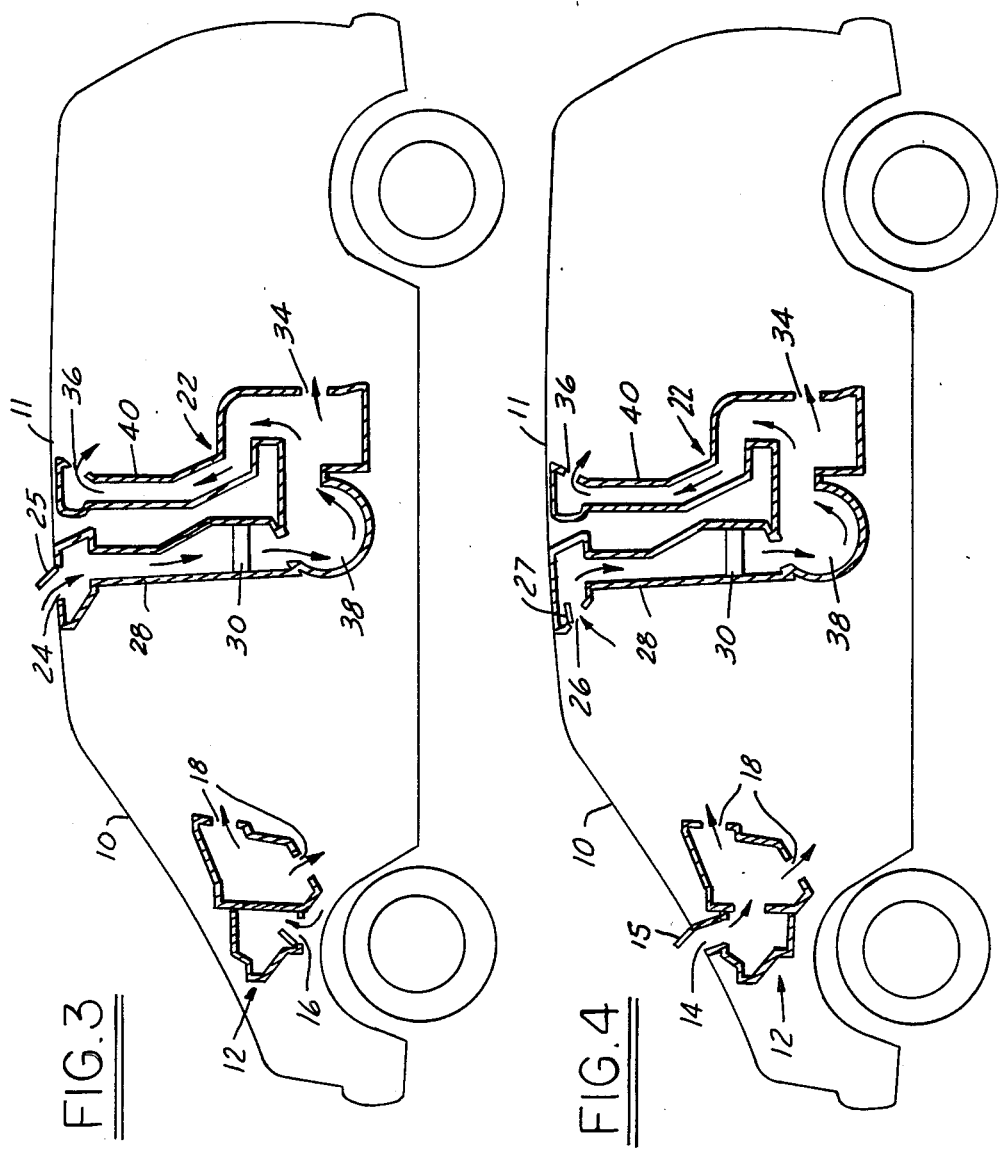

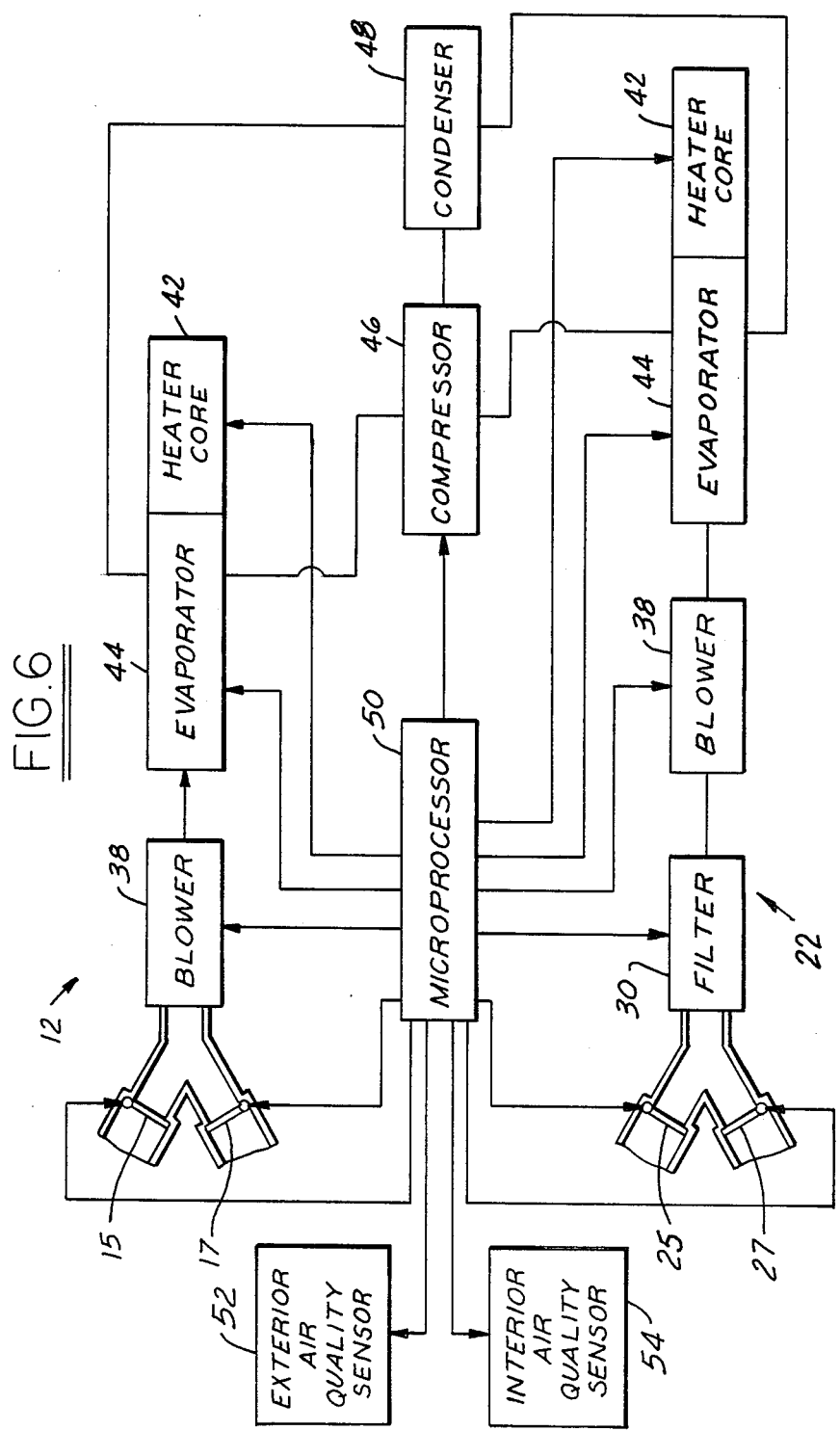

MULTIPLE UNIT AUTOMOTIVE CLIMATE CONTROL SYSTEM

BACKGROUND OF THE INVENTION

1. Field of the Invention

This invention relates to a multiple unit automotive climate control system.

2. Disclosure Information

Designers of automotive air conditioning systems have long recognized the need for supplying conditioned air to separate areas within the passenger compartment of the vehicle. U.S. Pat. No. 4,470,270 discloses an air conditioning system in which main and auxiliary cooling units control airflow amounts independently of each other. These units cannot, however, independently draw either fresh or interior air into themselves for the conditioning process.

The use of filtering means for providing filtered air to the passenger compartment of a motor vehicle is known as well. U.S. Pat. Nos. 4,007,875 and 4,189,987 disclose climate control systems employing filters. Neither of these systems includes two units having independent control of the intake source feeding each unit, whether that source be fresh or recirculated air.

A plethora of schemes has been devised for acquiring air and distributing it about the interior of a vehicle. U.S. Pat. Nos. 1,723,782 and 2,398,894 disclose two examples of vehicles having roof mounted inlet ducts for air distribution systems. Neither vehicle includes air conditioning nor does it include air filtration means.

Vehicular distribution systems have additionally included other types of roof discharge apparatus. U.S. Pat. Nos. 2,203,814 and 4,432,213 as well as Japanese Patent Application No. 60-56625 and German Offenlegungsschrift No. 2838425 each disclose roof type distribution systems for incoming ventilation air.

It is an object of the present invention to provide a multiple unit automotive climate control system in which two air conditioning units operable in both fresh and recirculating modes are independently controllable.

It is a further object of the present invention to provide a multiple unit automotive climate control system in which the air passing through one unit is filtered regardless of whether the air has been recirculated from the passenger compartment or drawn from outside the vehicle.

It is yet another object of the present invention to provide a multiple unit automotive climate control system in which recirculated air is withdrawn from the passenger compartment and filtered in such a manner as to minimize the effects of interior air pollution due to such factors as tobacco smoke.

It is yet another object of the present invention to provide a multiple unit automotive climate control system in which information available from interior and exterior air quality sensors will be employed for the purpose of operating said multiple air conditioning units.

It is an advantage of the present invention that a multiple unit automotive climate control system according to this invention may be operated initially with both units in a recirculating mode so as to achieve maximum air conditioning capability and thereafter with one or both of said units in said fresh mode, with said second unit filtering the air passing through said unit during both the fresh and recirculating modes.

SUMMARY OF THE DISCLOSURE

In accordance with this invention, a multiple unit automotive climate control system for an automotive vehicle having a passenger compartment with a roof comprises a first air conditioning unit operable in both fresh and recirculating modes, a second air conditioning unit comprising means for filtering air passing through the unit with the unit being operable in both fresh and recirculating modes, and control means for independently operating the air conditioning units in the fresh and recirculating modes. The second air conditioning unit further comprises a fresh air intake extending through the roof of the motor vehicle so that fresh air will be drawn through the roof when the second air conditioning unit is operating in the fresh mode and interior air intake structures positioned so as to extract air or other gases from seating space for at least one occupant of the motor vehicle when the second air conditioning system is operating in the recirculating mode. The interior air intake structures are preferably positioned so as to extract air or other gases from the upper region of the seating space.

A control system comprising a component of the present invention preferably includes means for independently operating first and second air conditioning units in a plurality of conditions including:

(i) a first condition wherein the first unit is operated in the fresh mode and the second unit is operated in the recirculating mode;

(ii) a second condition wherein the first unit is operated in the recirculating mode and the second unit is operated in the fresh mode;

(iii) a third condition wherein each of the units is operated in the fresh mode; and (iv) a fourth condition wherein each of the units is operated in the recirculating mode.

A control system according to the present invention further comprises means for operating the aforesaid air conditioning units so that the first and second units will cool the passenger compartment of the motor vehicle with each unit operating: (i) initially in the recirculating mode; and (ii) finally in the fresh mode at such time that the passenger compartment has been partially cooled.

Each of the multiple units used with the present invention comprises means for heating and cooling air passing through the units. The control means comprises means for independently controlling the multiple units so that either one of the units could be operated to cool the air while the other unit is heating the air. Alternatively, both units may be operated to either heat or cool the air. The control means further comprises means for selectively operating the fresh air intake and the interior intake structures of the second air conditioning unit so that the fresh air intake will be closed and the interior intake will be open when the second air conditioning unit is operating in the recirculating mode and further so that the interior intake structures will be closed and the fresh air intake will be open when the second air conditioning unit is operating in the fresh mode.

A control system according to the present invention may further comprise means for selectively operating said air conditioning units in:

(i) said first condition when said exterior sensor indicates that air outside said passenger compartment is not contaminated and said interior sensor indicates that air inside said passenger compartment is contaminated;

(ii) said second condition when said exterior sensor indicates that air outside said passenger compartment is contaminated and said interior sensor indicates that air inside said passenger compartment is not contaminated;

(iii) said third condition when said exterior and interior sensors indicate that air outside as well as inside said passenger compartment is not contaminated; and (iii) said fourth condition when said exterior and interior sensors indicate that air outside as well as inside said passenger compartment is contaminated.

BRIEF DESCRIPTION OF THE DRAWINGS

FIG. 1 is a schematic view of a motor vehicle with a multiple unit climate control system. Both of the air conditioning units are shown as operating in the fresh mode.

FIG. 2 is similar to FIG. 1 but shows both of the air conditioning units operating in the recirculating mode.

FIG. 3 is similar to FIGS. 1 and 2 but shows the first or front air conditioning unit operating in the recirculating mode while the second (rear) air conditioning unit is operating in the fresh mode.

FIG. 4 is similar to FIGS. 1-3 but shows the first air conditioning unit operating in the fresh mode, whereas the second air conditioning unit is operating in the recirculating mode.

FIG. 6 is a schematic representation of the first and second air conditioning units and control system according to the present invention.

DESCRIPTION OF THE PREFERRED EMBODIMENTS

Figure 5:
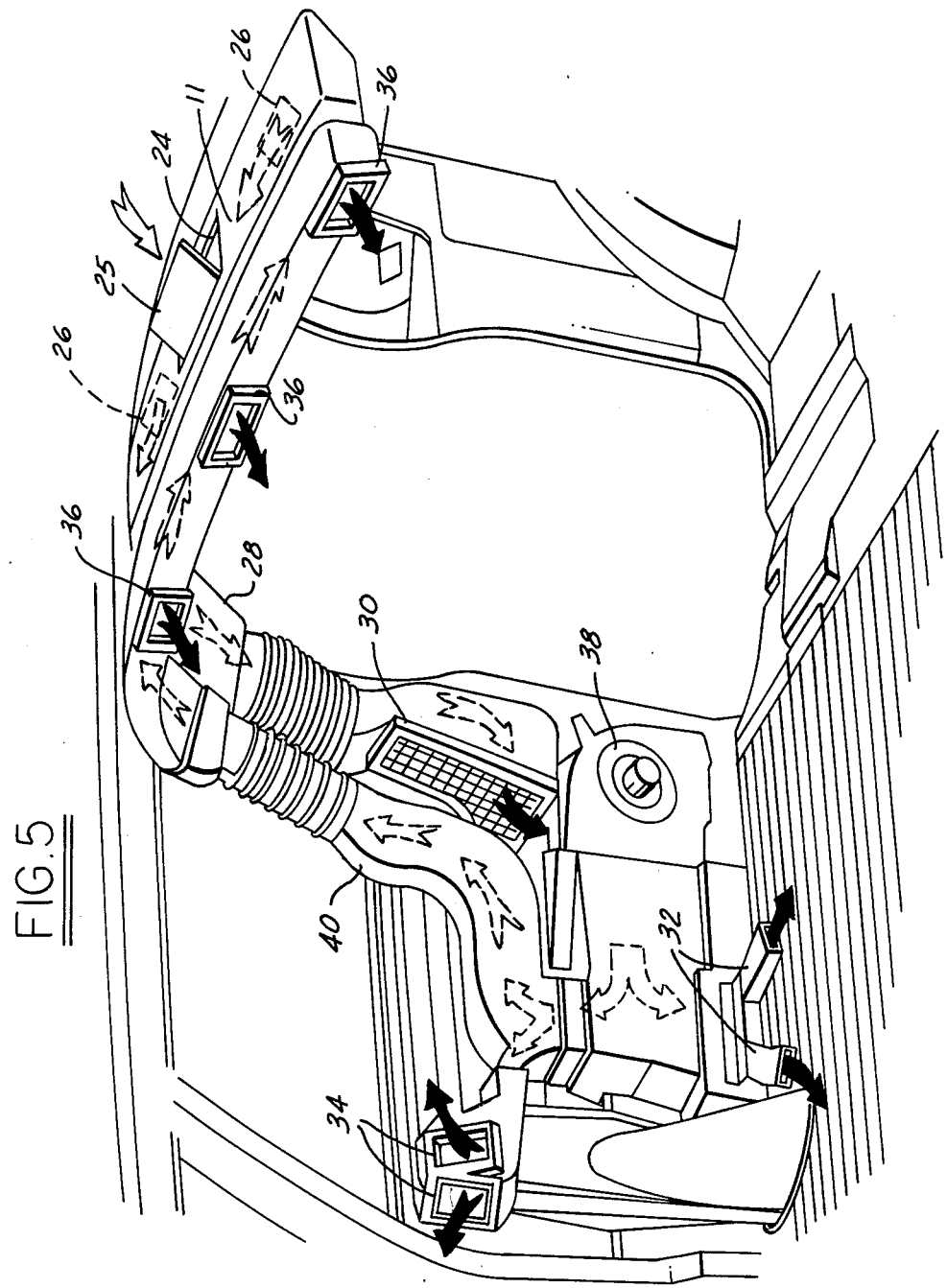
FIG. 5 is a partially schematic representation of one embodiment of a second air conditioning unit according to the present invention.

As shown in FIGS. 1-4, a multiple unit automotive climate control system according to the present invention comprises a first or front air conditioning unit 12, and a second, or rear, air conditioning unit 22 which is mounted behind the front seat driver and passenger seating positions. As further shown in FIGS. 1-4, first air conditioning unit 12 comprises fresh air intake 14 which is controlled by fresh air intake door 15. Fresh air intake door 15 may be mounted in the cowl area of the motor vehicle's exterior or at any other position near the front of the vehicle. Air passing over the fresh air intake door and through fresh air intake 14 moves to first air conditioning unit 12, wherein the air may be either heated or cooled. After passing through air conditioning unit 12, the air is discharged through a plurality of outlets 18. These outlets may comprise conventional floor registers or defrost air registers or other registers discharging at other locations within the vehicle. As shown in FIG. 2, first air conditioning unit 12 may also be operated in a recirculating mode in which air from the interior of the vehicle is drawn through recirculating air intake 16, which is controllably operated by recirculating air intake door 17. Thus, when looking at FIGS. 1 and 2 in combination one sees that first air conditioning unit 12 can be operated in a fresh mode in which fresh air is drawn from outside the vehicle or in a recirculating mode in which air is drawn from inside the passenger compartment. Although this specification and claims are specifically directed to an automotive vehicle, those skilled in the art will appreciate in view of this disclosure that a system according to the present invention could be employed with aircraft, rail borne, or extra-terrestrial or other types of vehicles.

As is further shown in FIGS. 1 and 2, a multiple unit automotive climate control system according to the present invention comprises second air conditioning unit 22 which comprises means for filtering air passing through the unit. Second air conditioning unit 22 may also be operated in both fresh and recirculating modes. During operation in the fresh mode, trap door 25, which is located in the roof of the vehicle, is opened to allow air to flow into fresh air intake 24 and then into inlet duct 28 and then through filter 30. Air passing through filter 30 and then through blower 38 is then discharged through various outlets which will be explained in greater detail.

FIG. 2 illustrates operation of second air conditioning unit 22 in the recirculating mode. While operating in this mode, recirculating air intakes 26 extract air or other gases from seating places for at least the two front occupants of the vehicle. Additional air intakes could be provided so that each seating position is served by at least one recirculating air intake. The air or other gases is then passed through filter 30 and then discharged through various outlets after passing through the balance of second air conditioning unit 22. Although FIGS. 1 and 2 illustrate trap door 25 as being completely closed at such time as recirculating air intakes 26 are open, and vice versa, those skilled in the art will appreciate in view of this disclosure that it may be desirable under certain conditions to operate the various doors in partially open positions. For example, while operating in a heating mode, it is usually desirable to supply only fresh (outside) air to the air conditioning system to prevent fogging of the windows to the vehicle. If, however, the humidity within the vehicle is quite low, e.g., when the passenger loading is light, operation of the air conditioning system in a recirculating mode will provide much quicker realization of the desired operating temperature.

FIG. 5 illustrates several details of second air conditioning system 22. As shown in FIG. 5, air may be allowed to enter both through fresh air intake 24, which is controlled by trap door 25, as well as through recirculating air intakes 26, which comprise interior intake structures. As is further shown in FIG. 5, fresh air intake 24 extends through the roof of the vehicle so that fresh air can be drawn directly through roof 11 when the second air conditioning unit is operated in the fresh mode. If, on the other hand, it is desired to operate the second air conditioning unit 22 in the recirculating mode, interior air may be drawn from a plurality of recirculating air intakes 26 and then passed through inlet duct 28 and filter 30, as previously explained. In each case, the air moving into second air conditioning unit 22 will be drawn through filter 30 by blower 38.

Air passing through the second air conditioning unit may selectively be discharged through either floor level outlets 32, or mid-level outlets 34, or high-level outlets 36 (FIG. 5). Those skilled in the art will appreciate in view of this disclosure that a control system utilized with this invention may be arranged so as to discharge air through more than one outlet or, indeed, through all three outlets proportionally, or otherwise, depending upon the needs of the passengers within the vehicle.

FIG. 6 illustrates various component parts of the first and second air conditioning units and the control system. Each air conditioning unit comprises blower 38, which feeds air to evaporator 44 and then to heater core 42. In conventional manner, the evaporator is supplied with refrigerant by means of compressor 46 and condenser 48 and heater core 42 is supplied with heated engine coolant. As is further shown in FIG. 6, filter 30 associated with second air conditioning unit 22 filters all air passing through the second air conditioning unit. Finally, microprocessor 50 is employed to control the speed of each blower 38, the temperatures of the heater core and evaporator, and the operation of the compressor and the filter. Microprocessor 50 could be employed for the additional purpose of operating the various doors associated with a system according to the present invention. Accordingly, fresh air intake door 15, trap door 25, and recirculating air intake doors 17 and 27 could be operated by the microprocessor.

Those skilled in the art will appreciate in view of this disclosure that microprocessor 50 may be employed in conjunction with an appropriate sensor to measure the pressure drop across filter 30. If the pressure drop is known, the operator may be provided with a signal when the filter has become contaminated and should be changed. Those skilled in the art will further appreciate in view of this disclosure that microprocessor 50 could be provided with other types of sensors for detecting chemical contamination of filter 30. The filter itself could include one or more types of media such as pelleted activated charcoal, spun fiberglass, foam, or pleated paper. The present invention is advantageous in this regard because the filter may be operated with a pressure drop which would ordinarily preclude sufficient air flow from passing through the climate control system of the vehicle but for the fact that the first air conditioning unit will be available to process air at the same time as the second unit is filtering air. Accordingly, a lower flow rate can be tolerated through the second air conditioning unit and this tolerance will allow very efficient filtration of the air passing through the second air conditioning unit.

As shown in FIG. 6, a multiple unit automotive climate control system according to the present invention preferably comprises exterior air quality sensor 52 and interior air quality sensor 54. Those skilled in the art will appreciate in view of this disclosure that the air quality sensors could be selected from a variety of devices operating according to well known principles such as non-dispersive infran-red (NDIR), flame ionization detection, or other types of chemical or optical detection or analysis. In any event, sensors 52 and 54 may be employed to check for such contaminants as smoke, unburned hydrocarbons, noxious odors, pollen, or other contaminants.

Returning to FIGS. 1-4, it should be understood that FIG. 4 shows a first operating condition set by microprocessor 50 through its operation of fresh air intake door 15, trap door 25, and recirculating air intake doors 17 and 27. This first operating condition is characterized by operation of the first unit in the fresh mode and the second unit in the recirculating mode. FIG. 3 shows a second operating condition wherein the first unit is operated in the recirculating mode and the second unit is operated in the fresh mode. FIG. 1 shows a third operating condition wherein each of the units is operated in the fresh mode. Finally, FIG. 2 discloses a fourth operating condition wherein each of the units is operated in the recirculating mode. In general, it is thus seen that the control system comprises means for selectively operating trap door 25 and recirculating air intake doors 27 of the second air conditioning unit so that the trap door will be closed and the recirculating air intake doors will be open during the recirculating mode and conversely, so that the recirculating air intake doors which comprises interior intake structures will be closed and the trap door (and, hence, the fresh air intake), will be open when the second air conditioning unit is operating in the fresh mode.

Microprocessor 50 may be programmed to interact with the air conditioning units and interior and exterior air quality sensors as follows. When exterior sensor 52 indicates that air outside the passenger compartment is not contaminated, but interior sensor 54 indicates that air inside the passenger compartment is contaminated, the climate control system may be operated in the first condition so that fresh air is brought into the passenger compartment through first air conditioning unit 12 while second air conditioning unit 22 draws contaminated air from the passenger compartment and filters the contaminated air before returning it to the interior of the vehicle. This operating condition is particularly helpful when, for example, one of the front seat passengers of the vehicle decides to smoke a tobacco product. In this case, the fumes from the burning tobacco will be drawn directly into recirculating air intakes 26, thereby precluding the smoke from impinging upon the other occupants of the vehicle, and then filtered before being returned to the passenger compartment.

The second operating condition, wherein first unit 12 is operated in the recirculating mode, and second unit 22 is operated in the fresh mode, may be useful when exterior sensor 52 indicates that air outside the passenger compartment is contaminated but interior sensor 54 indicates that air within the passenger compartment is not contaminated. This situation could be encountered if, for example, the vehicle is passing within close proximity to a diesel bus or truck discharging exhaust having a high odor content. This operating mode may also be useful with other types of environmental contamination such as pollen and the like. In any event, first unit 12 will operate in the recirculating mode, and will thus not contribute contaminated air to the interior. Second unit 22, on the other hand, will bring in fresh air for decontamination by filter 30.

The third operating condition, wherein both of the air conditioning units is operated in the fresh mode, is useful when: (i) neither of the air quality sensors indicates that contamination is present, and (ii) the climate control system is being operated in a cooling or heating mode and the temperature of the passenger compartment has reached the desired level.

The fourth operating condition, wherein both of the air conditioning units is operated in the recirculating mode, is useful when both of the air quality sensors indicate that contamination is present. In this situation, it is believed that the level of interior air pollution will be mitigated by the filtration or purification of the interior air without the introduction of contaminated air from outside the vehicle. This fourth operating condition is useful too when the interior temperature of the vehicle is excessively great, such as after the vehicle has been parked outside for some time on a warm summer day. In such a situation, it is desirable to bring maximum cooling performance to bear, and this may be accomplished by operating both air conditioning units in the recirculating mode.

Various modifications and variations will no doubt occur to those skilled in the various arts to which this invention pertains. For example, certain functions of microprocessor 50 could be performed by conventional switching circuits, conventional sliding mechanical control cables, or other conventional control devices. All such modifications and variations which basically rely upon the teachings with which this disclosure has advanced the art are properly considered within the scope of this invention as defined by the appended claims.

We claim:

1. A climate control system for an automotive vehicle having a passenger compartment with a roof, comprising:
   a first air conditioning unit operable in both fresh and recirculating modes;
   a second air conditioning unit comprising means for filtering air passing through said unit, with said unit being operable in both fresh and recirculating modes; and
   control means for independently operating said air conditioning units in said fresh mode and said recirculating mode.

2. A climate control system according to claim 1 wherein said second air conditioning unit further comprises a fresh air intake extending through the roof of said motor vehicle so that fresh air will be drawn through said roof when said second air conditioning unit is operating in said fresh mode.

3. A climate control system according to claim 1 wherein said second air conditioning unit further comprises interior air intake structures positioned so as to extract air or other gases from seating space for at least one occupant of said motor vehicle when said second air conditioning system is operating in said recirculating mode.

4. A climate control system according to claim 3 wherein said interior air intake structures are positioned so as to extract air or other gases from the upper region of said seating space.

5. A climate control system according to claim 1 wherein said control system comprises means for operating said air conditioning units so that said first unit is operated in said fresh mode and said second unit is operated in said recirculating mode.

6. A climate control system according to claim 1 wherein said control system comprises means for operating said air conditioning units so that said first unit is operated in said recirculating mode and said second unit is operated in said fresh mode.

7. A climate control system according to claim 1 wherein each of said air conditioning units comprises separate means for heating and cooling air passing through said units.

8. A climate control system according to claim 1 wherein said control system comprises means for operating said air conditioning units so that said first and second units will cool the passenger compartment of said motor vehicle with each unit operating: (i) initially in said recirculating mode; and (ii) finally in said fresh mode when said passenger compartment has been partially cooled.

9. A climate control system for an automotive vehicle having a passenger compartment with a roof, comprising:
   a first air conditioning unit operable in both fresh and recirculating modes;
   a second air conditioning unit comprising means for filtering air passing through said unit, with said unit being operable in both fresh and recirculating modes; and
   control means for independently operating said air conditioning units in a plurality of conditions comprising:
   (i) a first condition wherein said first unit is operated in said fresh mode and said second unit is operated in said recirculating mode;
   (ii) a second condition wherein said first unit is operated in said recirculating mode and said second unit is operated in said fresh mode;
   (iii) a third condition wherein each of said units is operated in said fresh mode; and
   (iv) a fourth condition wherein each of said units is operated in said recirculating mode.

10. A climate control system according to claim 9 wherein said second air conditioning unit further comprises a fresh air intake extending through the roof of said motor vehicle and a recirculating air intake including interior air intake structures positioned so as to extract air or other gases from seating spaces for at least two occupants of said motor vehicle.

11. A climate control system according to claim 10 wherein said control means comprises means for selectively operating said fresh air intake and said interior air intake structures so that said fresh air intake will be closed and said interior air intake structures will be open when said second air conditioning unit is operating in said recirculating mode and said said interior intake structures will be closed and said fresh air intake will be open when said second air conditioning unit is operating in said fresh mode.

12. A climate control system according to claim 10 wherein said control means comprises exterior sensor means for assessing the quality of air outside said passenger compartment and interior sensor means for assessing the quality of air inside said passenger compartment.

13. A climate control system according to claim 12 wherein said control means further comprises means for selectively operating said air conditioning units in:
   (i) said first condition when said exterior sensor indicates that air outside said passenger compartment is not contaminated and said interior sensor indicates that air inside said passenger compartment is contaminated;
   (ii) said second condition when said exterior sensor indicates that air outside said passenger compartment is contaminated and said interior sensor indicates that air inside said passenger compartment is not contaminated;
   (iii) said third condition when said exterior and interior sensors indicate that air outside as well as inside said passenger compartment is not contaminated; and
   (iii) said fourth condition when said exterior and interior sensors indicate that air outside as well as inside said passenger compartment is contaminated.

14. A climate control system for an automotive vehicle having a passenger compartment with a roof, comprising:
   a first air conditioning unit operable in both fresh and recirculating modes;
   a second air conditioning unit operable in both fresh and recirculating modes and comprising: (i) means for filtering air passing through said unit; (ii) a fresh air intake extending through the roof of said vehicle; and (iii) a plurality of air intake structures positioned so as to extract air or other gases from seating spaces for at least two occupants of said vehicle when said second air conditioning system is operating in said recirculating mode; and
   control means for independently operating said air conditioning units in said fresh mode and said recirculating mode for either heating or cooling the air passing individually through said air conditioning units.

* * * * *